United States Patent
Kim et al.

(10) Patent No.: US 7,869,406 B2
(45) Date of Patent: Jan. 11, 2011

(54) METHOD FOR HAND-OVER IN THE MIXED NETWORK ASYNCHRONOUS COMMUNICATION NETWORK AND SYNCHRONOUS COMMUNICATION NETWORK

(75) Inventors: Hyun-Wook Kim, Seongnam-si (KR); Young-Lak Kim, Yongin-si (KR); Nam-Gun Kim, Seoul (KR); Jong-Tae Ihm, Seongnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 492 days.

(21) Appl. No.: 11/576,516

(22) PCT Filed: Jan. 4, 2005

(86) PCT No.: PCT/KR2005/000010

§ 371 (c)(1),
(2), (4) Date: Jul. 1, 2008

(87) PCT Pub. No.: WO2006/073210

PCT Pub. Date: Jul. 13, 2006

(65) Prior Publication Data

US 2008/0261601 A1   Oct. 23, 2008

(51) Int. Cl.
*H04Q 7/00* (2006.01)

(52) U.S. Cl. .................................................. 370/331

(58) Field of Classification Search ................. 370/310, 370/328, 331, 342–345; 455/403, 436–444
See application file for complete search history.

(56) References Cited

U.S. PATENT DOCUMENTS

| | | | |
|---|---|---|---|
| 6,704,581 B1 * | 3/2004 | Park et al. | 455/553.1 |
| 7,016,326 B2 * | 3/2006 | Holcman et al. | 370/331 |
| 7,079,841 B2 * | 7/2006 | Park | 455/436 |
| 7,096,020 B2 * | 8/2006 | Choi et al. | 455/439 |
| 7,409,214 B2 * | 8/2008 | Lee | 455/436 |
| 7,729,723 B2 * | 6/2010 | Park et al. | 455/552.1 |
| 2002/0071404 A1 | 6/2002 | Park et al. | |

FOREIGN PATENT DOCUMENTS

| | | |
|---|---|---|
| JP | 09-247743 | 9/1997 |
| JP | 2000-092541 | 3/2000 |
| JP | 2001-0136559 | 5/2001 |
| JP | 2001-186552 | 7/2001 |
| JP | 2003-189345 | 7/2003 |
| JP | 2003-319454 | 11/2003 |
| JP | 2004-193853 | 7/2004 |
| WO | 03/050976 | 6/2003 |

* cited by examiner

*Primary Examiner*—Dmitry H Levitan
(74) *Attorney, Agent, or Firm*—Lowe Hauptman Ham & Berner, LLP

(57) ABSTRACT

Disclosed herein is a handover method for a mobile communication terminal in a mobile communication network in which an asynchronous network and a synchronous network coexist. In the present invention, as a mobile communication terminal, which is making a call through an asynchronous mobile communication system, moves into the area of a synchronous mobile communication system, and thus a handover event occurs, the establishment of a call with a synchronous mobile communication system is performed by the automatic call termination or origination of the mobile communication terminal while a connection between the asynchronous modem unit of the mobile communication terminal and the asynchronous mobile communication system is maintained, and then the connection with the asynchronous mobile communication system is released. Accordingly, a call interruption can be prevented at the time of handover between heterogeneous networks.

16 Claims, 6 Drawing Sheets

METHOD FOR HAND-OVER IN THE MIXED NETWORK ASYNCHRONOUS COMMUNICATION NETWORK AND SYNCHRONOUS COMMUNICATION NETWORK

CROSS REFERENCE TO RELATED APPLICATION

This application is the National Phase application of International Application No. PCT/KR2005/000010, filed Jan. 4, 2005, which designates the United States and was published in English. This application, in its entirety, is incorporated herein by reference.

TECHNICAL FIELD

The present invention relates to a handover method in a mobile communication network and, in particular, to a handover method for a mobile communication terminal in a mobile communication network in which an asynchronous network and a synchronous network coexist.

BACKGROUND ART

With the development of mobile communication technology and the evolution of communication networks, a variety of mobile communication systems have been developed. In order to solve the problem of global roaming between the mobile communication systems, the International Mobile Telecommunication (IMT)-2000 systems have been developed. The IMT-2000 systems are classified into a Code Division Multiple Access (CDMA) 2000-based synchronous system and a Wideband Code Division Multiple Access (WCDMA)-based asynchronous system.

Furthermore, in order to support global roaming between the mobile communication systems, a mobile communication terminal capable of being used for both a synchronous type system and an asynchronous type system, that is, a Dual Band Dual Mode (DBDM) mobile communication terminal, has been developed. Using the DBDM mobile communication terminal, different types of services can be used in an asynchronous system area and a synchronous system area.

Currently, the asynchronous mobile communication network is being constructed in regions having high demand for service and, therefore, the synchronous mobile communication network is evolving such that the service area thereof includes the service areas of an asynchronous system. In such a situation, handover between the systems is necessary so as to provide continuous service in the case where a user moves between the asynchronous mobile communication system and the synchronous mobile communication system.

Conventionally, at the time of handover between the asynchronous and synchronous mobile communication systems, handover is performed in such a manner that communication with a mobile communication system with which a connection exists is interrupted and connection with a different mobile communication system is made. This case is problematic in that a considerable handover time (several hundred msec) is required, resulting in an unacceptably long interruption, therefore the quality of service is degraded.

SUMMARY OF THE INVENTION

Accordingly, the present invention has been made keeping in mind the above problems occurring in the prior art, and an object of the present invention is to provide a handover method, which at the time of handover between asynchronous and synchronous mobile communication systems, establishes a call by attempting a call from a synchronous mobile communication system to a mobile communication terminal or by attempting a call from the mobile communication terminal to the synchronous mobile communication system, and then releases a connection with the asynchronous mobile communication system after a communication path is formed between the mobile communication terminal and the synchronous mobile communication system, thus preventing interruption to a call.

DETAILED DESCRIPTION OF THE INVENTION

In the present invention, as a mobile communication terminal, which is making a call through an asynchronous mobile communication system, moves into the area of a synchronous mobile communication system, and thus a handover event occurs, the establishment of a call with the synchronous mobile communication system is performed by the automatic call termination or origination of the mobile communication terminal while a connection between the asynchronous modem unit of the mobile communication terminal and the asynchronous mobile communication system is maintained, and then the connection with the asynchronous mobile communication system is released.

A preferred embodiment of the present invention is described in detail with reference to the accompanying drawings below.

Figure 1:
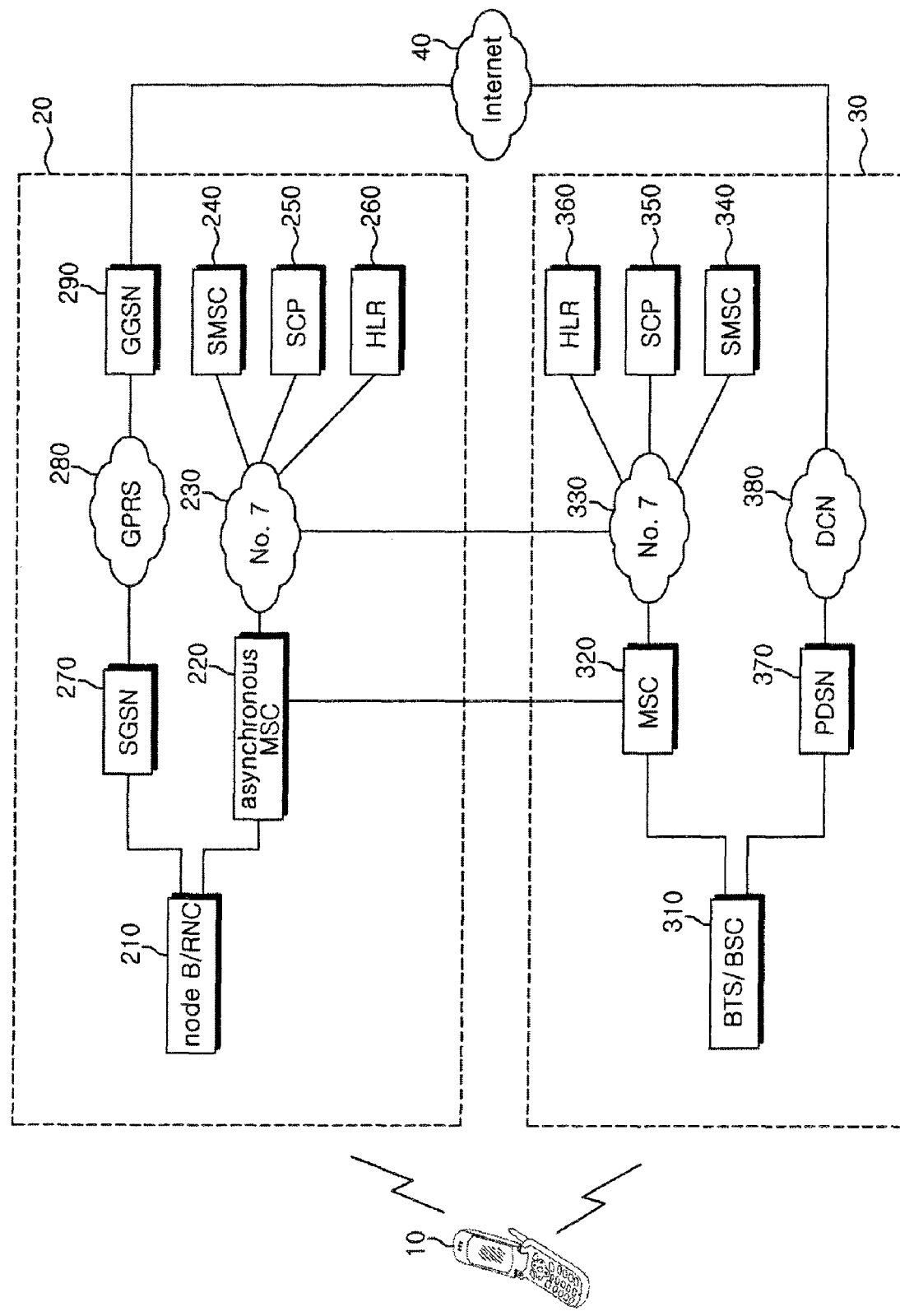
FIG. 1 is a diagram showing the construction of a mobile communication network to which the present invention is applied.

FIG. 1 is a diagram showing the construction of a mobile communication network to which the present invention is applied.

A mobile communication terminal 10 applied to the present invention is a Dual Band Dual Mode (hereinafter abbreviated as a 'DBDM') mobile communication terminal, and can provide both asynchronous mobile communication service and synchronous mobile communication service. A detailed description thereof will be made with reference to FIG. 2. The DBDM mobile communication terminal 10 can selectively and wirelessly connect with an asynchronous mobile communication system 20 and a synchronous mobile communication system 30, and use voice and data services.

The asynchronous mobile communication system 20 includes a node B/Radio Network controller (RNC) 210 composed of a node B, that is, a base station for communicating with the mobile communication terminal 10 in a wireless region and an RNC for controlling the node B, an asynchronous Mobile Switching Center (MSC) 220 connected to the node B/RNC 210 to perform call switching so as to provide services to the mobile communication terminal 10, a Short Message Service Center (SMSC) 240 connected to the asynchronous MSC 220 through a No. 7 common signaling network 230, a Service Control Point (SCP) 250, a Home Location Register (HLR) 260, a Serving GPRS Support Node (SGSN) 270 connected between the node B/RNC 210 and a General Packet Radio Service (GPRS) network 280 to maintain the location track of the mobile communication terminal 10 and to perform access control and a security function, and a Gateway GPRS Support Node (GGSN) 290 connected to the SGSN 270 through the GPRS network 280 and connected to the Internet 40 to support operation in conjunction with external packets.

Furthermore, the synchronous mobile communication system 30 includes a BTS/BSC 310 composed of a Base Transceiver System (BTS) for supporting communication with the mobile communication terminal 10 in a wireless region and a Base Station Controller (BSC) for controlling the BTS, a MSC 320 connected with one or more BSCs to perform call switching, a SMSC 340 connected to the MSC 320 through a No. 7 common signaling network 330, a SCP 350, a HLR 360, a Packet Data Service Node (PDSN) 370 connected to the BSC to provide subscribers with packet data services, and a Data Core Network (DCN) 380 for supporting a connection between the PDSN 370 and the Internet 40.

The MSC 220 of the asynchronous mobile communication system 20 and the MSC 320 of the synchronous mobile communication system 30 are connected to each other and are also respectively connected with the No. 7 common signaling networks 230 and 330 to transmit and receive information required for handover of the mobile communication terminal 10.

In the mobile communication system, the mobile communication terminal 10 of the present invention is connected to both the asynchronous mobile communication system 20 and the synchronous mobile communication system 30, and transmits and processes the signal processing status of the two systems.

For the present invention, the mobile communication system 10 first selects the asynchronous mobile communication system 20 at the time of registering the location of the mobile communication terminal 10. The asynchronous mobile communication system 20 allows the mobile communication terminal 10 to respond to handover in advance by notifying the mobile communication terminal 10, which has requested the registration of the location, of the possibility of handover to the synchronous mobile communication system 30 at the time of requesting the registration of the location from the asynchronous mobile communication system 20. The mobile communication terminal 10, which has received the notification, transmits information about the terminal to the asynchronous mobile communication system 20, and the HLR 260 stores the information about the corresponding mobile communication terminal 10 and information including the fact that the mobile communication terminal 10 is a terminal for which handover can be performed, so that preparation for handover can be made in advance.

Furthermore, handover to the synchronous mobile communication system 30 is performed when the mobile communication terminal 10, which has been using service in the asynchronous mobile communication system area, moves into the synchronous mobile communication system area. Thereafter, the asynchronous mobile communication system 20 is selected again when the mobile communication terminal 10 is in an idle state by terminal the service.

Figure 2:
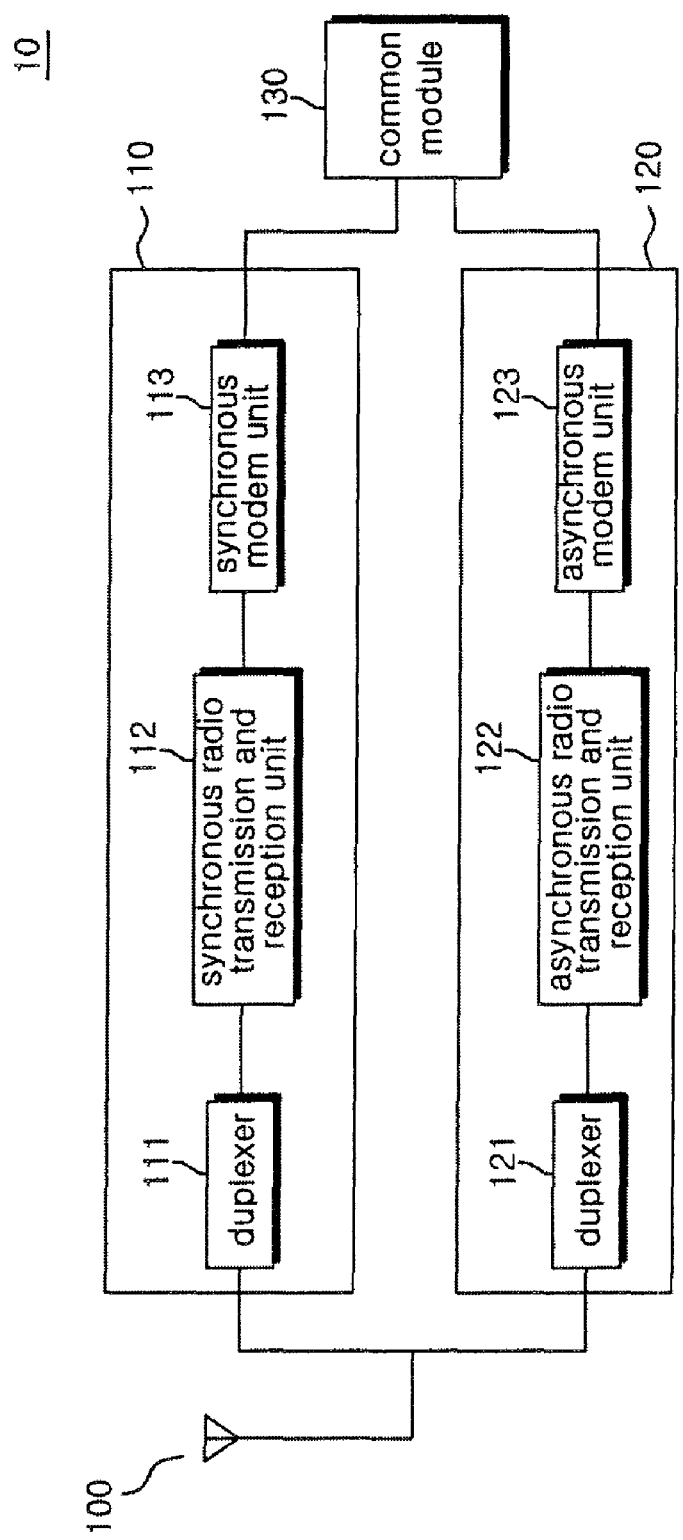
FIG. 2 is a diagram showing the construction of a mobile communication terminal applied to the present invention.

FIG. 2 is a diagram showing the construction of a mobile communication terminal that is applied to the present invention.

As shown in FIG. 2, the DBDM mobile communication terminal 10 applied to the present invention includes an antenna 100, a synchronous module 110 for synchronous mobile communication service, an asynchronous module 120 for asynchronous mobile communication service, and a common module 130.

The antenna 100 has a function of processing both a frequency band for a synchronous mobile communication service and a frequency band for an asynchronous mobile communication service.

The synchronous module 110 includes a duplexer 111 for operating as a band-pass filter for separately processing frequencies, a synchronous radio transmission and reception unit 112 for dividing transmission and reception radio waves into predetermined frequency bands, and a synchronous modem unit 113 for processing a wireless region protocol with respect to the synchronous mobile communication system. The asynchronous module 120 includes a duplexer 121 for operating as a band-pass filter for separately processing frequencies, an asynchronous radio transmission and reception unit 122 for dividing transmission and reception radio waves into predetermined frequency bands, and an asynchronous modem unit 123 for processing a wireless region protocol with respect to the asynchronous mobile communication system.

The common module 130 operates as a central processing unit for controlling the synchronous modem unit 113 and the asynchronous modem unit, and includes an application processor for performing a multimedia function, memory, input and output units, and some other application processing units.

Furthermore, the DBDM mobile communication terminal 10 is equipped with software for providing a user interface, supplementary service, mobility management, access/session control, resource control, and protocol processing, so that the software allows the user to use a variety of services, performs handover and converts protocols to fit the mobile communication systems.

Figure 3:
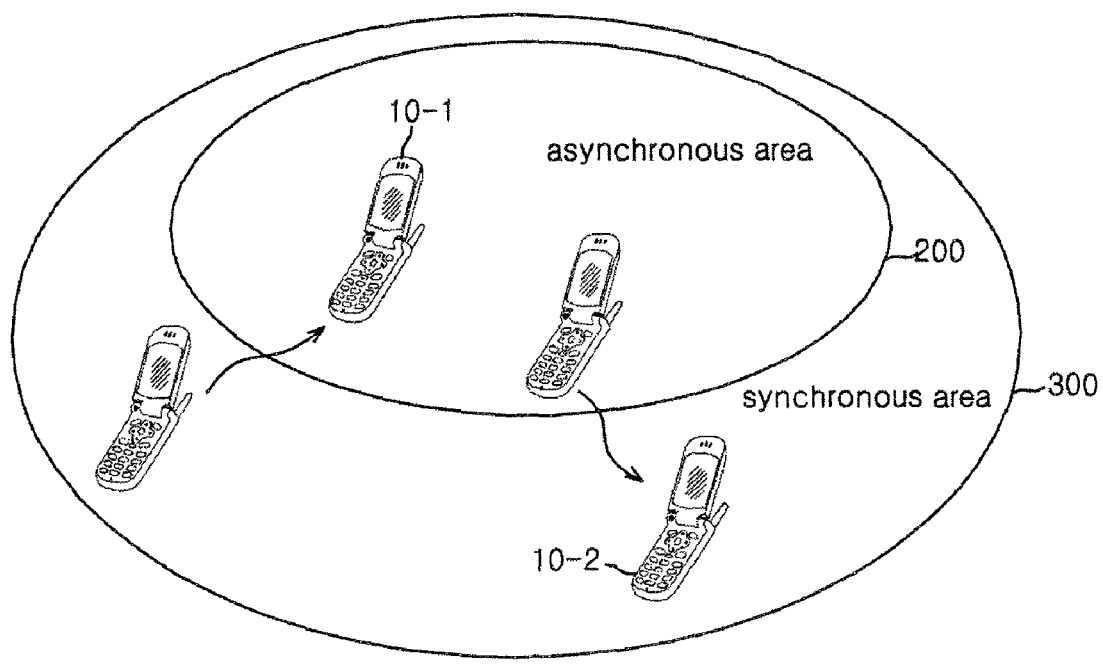
FIG. 3 is a conceptual diagram illustrating handover in a mobile communication network in which asynchronous and synchronous networks coexist.

FIG. 3 is a conceptual diagram illustrating handover in a mobile communication network in which asynchronous and synchronous networks coexist.

In a mobile communication system, handover (or handoff) refers to technology that allows a user to perform communication without call interruption in the case where a mobile communication terminal moves from one cell to another cell.

Although the present invention relates to a handover method for a DBDM mobile communication terminal in a mobile communication network in which the asynchronous and synchronous mobile communication systems coexist, and includes both the case where a mobile communication terminal 10-1 synchronous area 300 to an asynchronous area 200 and the case where a mobile communication terminal 10-2 moves from an asynchronous area 200 to a synchronous area 300, only a description of the latter will be made below.

In an embodiment of the present invention, as the mobile communication terminal 10-2, which has been using service in the asynchronous area 200, approaches the synchronous area 300, the magnitude of a pilot signal received from the node B of the asynchronous communication system to the mobile communication terminal 10-2 gradually attenuates, and the asynchronous communication system 20, having detected the power attenuation, requests handover to the synchronous mobile communication system 30 and, at the same time, directs the corresponding mobile communication terminal 10 to perform handover.

Accordingly, the synchronous mobile communication system 30 transmits a paging message to the mobile communication terminal 10-2 and forms a communication path as the mobile communication terminal 10-2 responds to the message. Thereafter, when the forming of the communication path is completed, the connection between the asynchronous mobile communication system 20 and the mobile communication terminal 10-2 is released, so that the mobile communication terminal 10-2, having moved into the synchronous area 300, can continuously use the service without call interruption.

In another embodiment of the present invention, the magnitude of a pilot signal received from the node B of the asynchronous communication system to the mobile communication terminal 10-2 gradually attenuates, and the asynchronous communication system 20, having detected the power attenuation, directs the synchronous module 110 of the mobile communication terminal 10-2 to attempt a connection with the synchronous mobile communication system 30, as the mobile communication terminal 10-2, which has been using service in the asynchronous area 200, approaches the synchronous area 300.

Accordingly, the synchronous module 110 of the mobile communication terminal 10-2 attempts a connection with the synchronous mobile communication system 30 after making transition to a traffic state, and thereby call establishment between the mobile communication terminal 10-2 and the synchronous communication system 30 is made, and the connection between the asynchronous mobile communication system 20 and the mobile communication terminal 10-2 is released, so that the mobile communication terminal 10-2, having moved into the synchronous area 300, can continuously use the service without call interruption.

Such a process is described in detail with reference to FIGS. 4 to 6 below.

Figure 4:
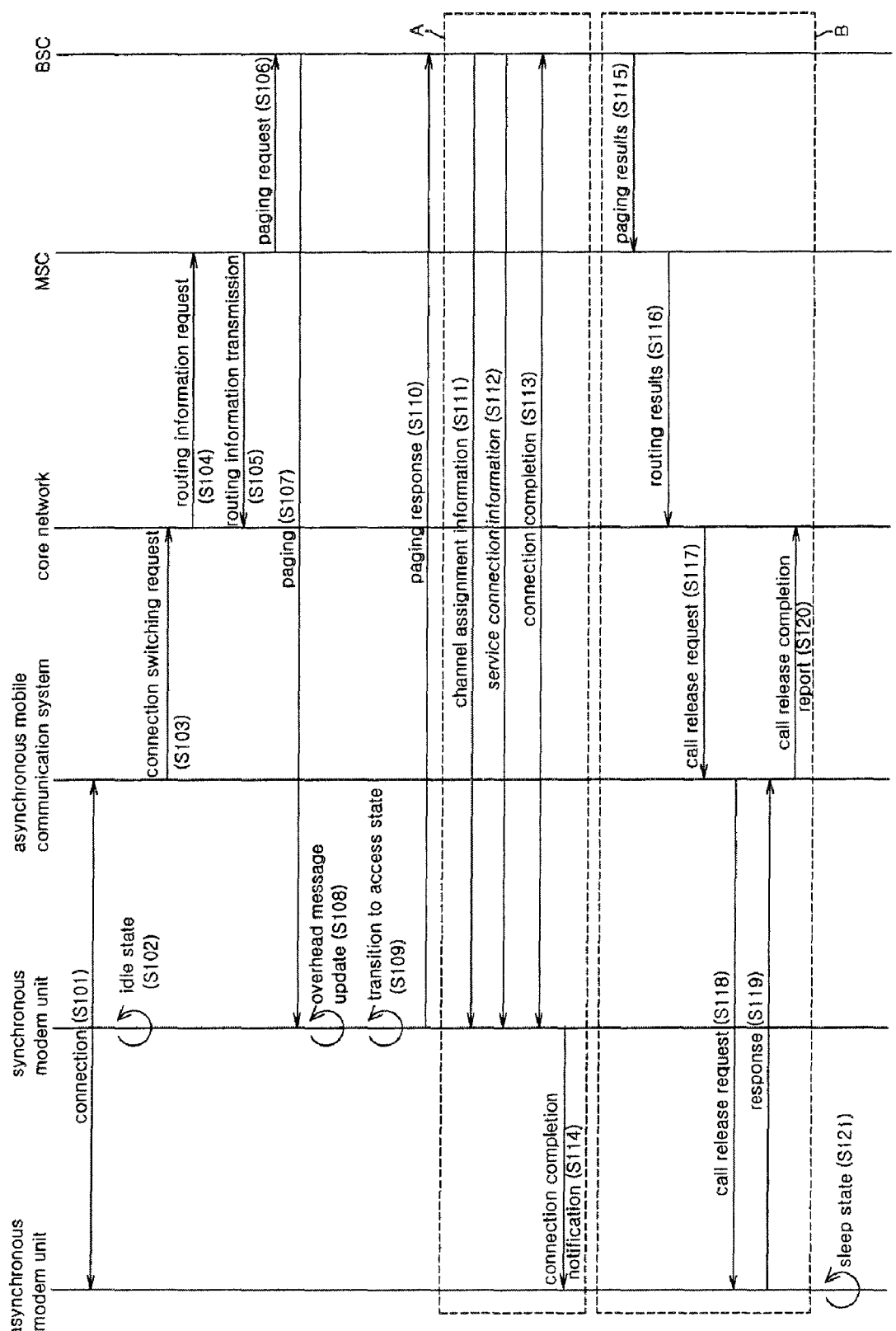
FIG. 4 is a flowchart illustrating a handover method according to an embodiment of the present invention.

FIG. 4 is a flowchart illustrating a handover method according to an embodiment of the present invention, and shows the handover method based on the automatic call termination of the synchronous mobile communication terminal, in which the synchronous mobile communication system establishes a call by transmitting a paging message to the mobile communication terminal at the time of the occurrence of a handover event.

In the state in which the mobile communication terminal 10 is connected to the asynchronous mobile communication system 20 and is making a phone call at step S101 (RRC connected state), the synchronous modem unit 113 of the mobile communication terminal 10 is in an idle state at step S102.

In this situation, when the mobile communication terminal 10 moves to the synchronous area 300 and a handover condition is satisfied, the asynchronous mobile communication system 20 requests the core network of the synchronous mobile communication system 30 to switch the connection environment of the mobile communication terminal 10 at step S103 (Relocation Required). In this case, the asynchronous mobile communication system 20 transmits the Identification (ID) number of the mobile communication terminal 10 along with the request, the core network requests routing information from the MSC at step S104 (RoutingReq), and the MSC transmits a response signal (routereq) to the core network in response to the request at step S105 and then requests paging from the BTS at step S106 (Paging Request).

Accordingly, the BTS initiates an automatic call termination, by transmitting a general page message to the synchronous modem unit 113 of the mobile communication terminal 10 at step S107, to allow the synchronous modem unit 113 to make a transition to a traffic state while the asynchronous modem unit 123 is connected to the asynchronous mobile communication system 20.

The synchronous modem unit 113 of the mobile communication terminal 10, which has received the paging message, updates an overhead message at step S108, makes transition to a access state at step 109, and then transmits a signal responding to the paging (Response Message) to the BTS of the synchronous mobile communication system 30 at step S110. Here, the overhead message includes system parameters, and information about access of the mobile communication terminal, BTS frequency, roaming, and neighboring BTSs. The BTS periodically transmits the information to the mobile communication terminal, and the mobile communication terminal must periodically update the information.

Thereafter, a process "A" of establishing a call between the synchronous modem unit 113 and the synchronous mobile communication system 30, and a process of releasing a call between the asynchronous modem unit 123 and the asynchronous mobile communication system 20 are simultaneously performed. In order to establish the call between the synchronous modem unit 113 and the synchronous mobile communication system 30, the BTS of the synchronous mobile communication system 30 first transmits information about the channel assignment (Extended Channel Assignment Message) to the synchronous modem unit 113 at step S111, and sequentially transmits information about the service connection (Service Connection Message) to the synchronous modem unit 113 at step S112, so that a connection between the synchronous modem unit 113 and the BTS of the synchronous mobile communication system is completed at step S113 (Service connection Complete).

When the connection between the synchronous modem unit 113 and the BTS of the synchronous mobile communication system is completed, the synchronous modem unit 113 notifies the asynchronous modem unit 123 of the completion of the connection at step S114 (Service connected), the BTS transmits paging results (Paging Rsp) to the MSC at step S115, and the MSC transmits routing results (MS on channel) to the core network at step S116, so that the core network can request call release from the asynchronous mobile communication system 20 at step 117 (Iu Release Command).

Accordingly, when the asynchronous mobile communication system 20 requests the call release from the asynchronous modem unit 123 at step S118 (RRC CONNECTION RELEASE) and the call is released as the asynchronous modem unit 123 responds to the request, the asynchronous mobile communication system 20 notifies the core network of the synchronous mobile communication system 30 of the completion of the call release at step 120 (Iu Release Completed), and the asynchronous modem unit 13 of the mobile communication terminal 10 makes the transition to a sleep state at step S121.

As described above, in the present embodiment, call establishment between the asynchronous mobile communication system and the asynchronous modem unit is released when call establishment has been made between the synchronous mobile communication system and the synchronous modem unit. The synchronous modem unit of the mobile communication terminal performs an automatic call termination for the paging of the synchronous communication system, so that handover can be performed without interruption to the cell.

Figure 5:
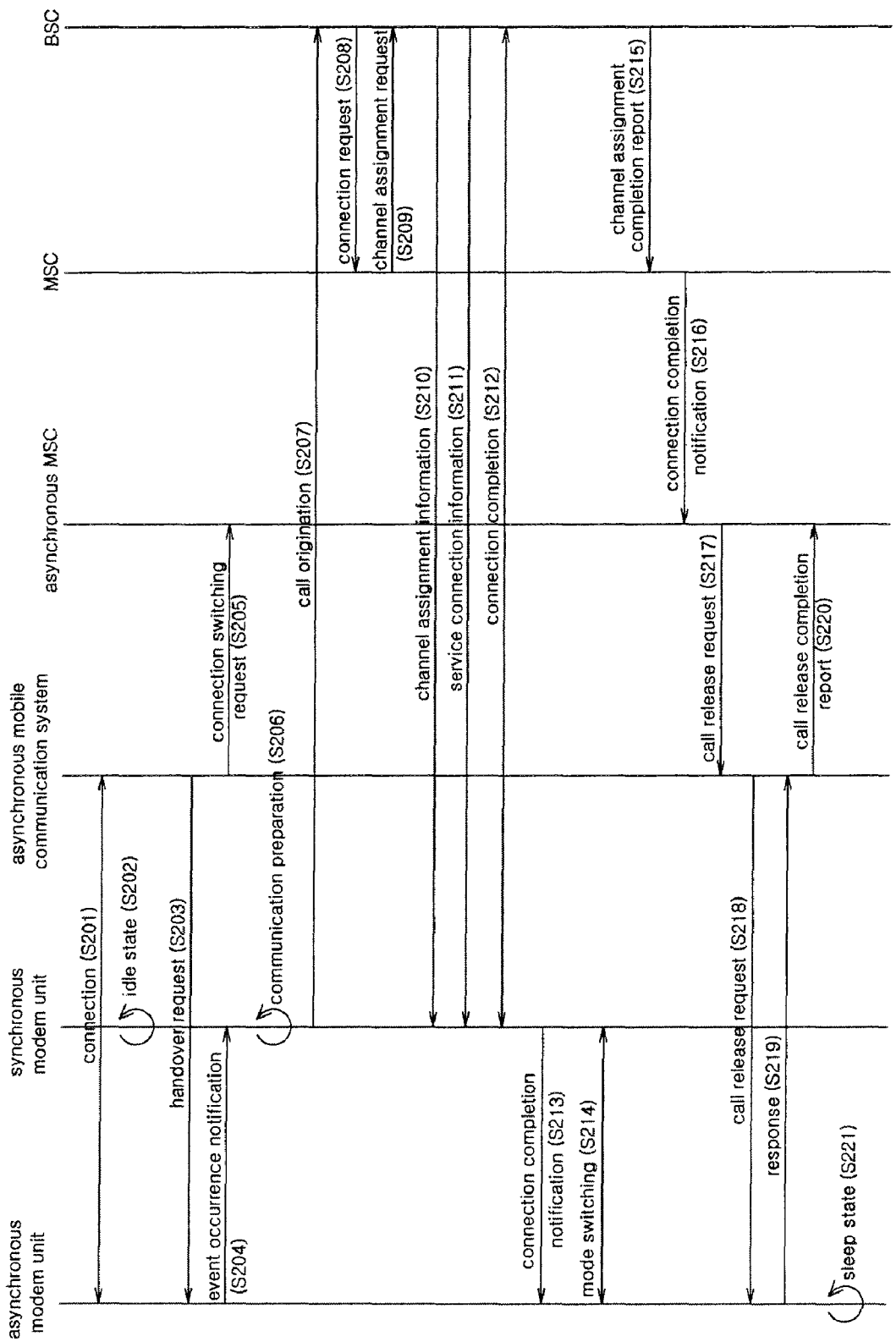
FIG. 5 is a flowchart illustrating a handover method according to another embodiment of the present invention.

FIG. 5 is a flowchart illustrating a handover method according to another embodiment of the present invention. This handover method is based on the automatic call origination by the synchronous mobile communication terminal, in which the mobile communication terminal establishes a new call by attempting a call origination to the synchronous mobile communication system at the time of the occurrence of a handover event.

In the state in which the mobile communication terminal 10 is connected to the asynchronous mobile communication system 20 and a phone call is made at step S201 (RRC connected state), the synchronous modem unit 113 of the mobile communication is in an idle state at step S202.

In this situation, when the mobile communication terminal 10 moves to the synchronous area 300 and a handover condition is satisfied, the asynchronous mobile communication system 20 directs the asynchronous modem unit 123 of the mobile communication terminal 10 to perform handover at step S203 (HANDOVER FROM UTRAN COMMAND). This message includes a message related to the synchronous mobile communication system and, in particular, includes information about the channel assignment. The channel assignment information is transmitted from the asynchronous modem unit 123 to the synchronous modem unit 113 and, therefore, allows the synchronous modem unit 113 to prepare for handover in advance. When the asynchronous modem unit 123 notifies the synchronous modem unit 113 of the occurrence of a handover event, and, therefore an automatic call origination is performed at step S204. Furthermore, at the step S204 of the asynchronous mobile communication system 20 directing the asynchronous modem unit 123 to perform handover, handover is performed while the handover message (Universal handoff direction message) of the synchronous mobile communication system 30 is transmitted along with the direction. In this case, the asynchronous mobile communication system 20 requests the asynchronous MSC to switch the connection environment of the mobile communication terminal 10 at step 205 (Relocation Required).

The synchronous modem unit 113, which is notified of the occurrence of a handover event by the asynchronous modem unit 123, prepares for communication with the synchronous mobile communication system 30 at step S206, and attempts a new call connection to the BTS of the synchronous mobile communication system 30 when the process of preparing for communication is completed at step 207 (Origination Message). In this case, it is preferable that a predetermined ID number also be transmitted in order to indicate that the call origination attempt is one involving handover.

The BTS requests connection from the MSC corresponding to the call origination attempt of the mobile communication terminal 10 at step S208 (Service Req.), and the MSC allows a channel to be assigned to the BTS at step S209 (Assignment Req.), so that the BTS transmits information about the channel assignment (Extended Channel Assignment) and information about the service connection (Service Connect Message) to the synchronous modem unit 113 of the mobile communication terminal 10 at step S210, therefore the connection between the synchronous modem unit 113 and the BTS is completed at step S212 (Service Connect Complete).

When the connection between the synchronous modem unit 113 of the mobile communication terminal and the synchronous mobile communication system 30 is completed, the synchronous modem unit 113 notifies the asynchronous modem unit 123 of the completion of the connection at step S213, so that mode switching between the asynchronous modem unit 123 and the synchronous modem unit 113 is performed.

Meanwhile, the BTS notifies the MSC of the completion of the channel assignment at step S215 (Assignment Complete). The MSC, which has received the notification, notifies the asynchronous MSC of the completion of the connection switching of the mobile communication terminal 10 at step S216 (MS on channel), and therefore allows the asynchronous MSC to request the asynchronous mobile communication system 20 to release a call with the asynchronous modem unit 123 at step 217 (Iu Release Command).

The asynchronous mobile communication system 20 requests call release from the asynchronous modem unit 123 at step S218 (RRC CONNECTION RELEASE). When the asynchronous modem unit 123 responds to the request at step S219, the asynchronous mobile communication system 20 notifies the asynchronous MSC of the completion of call release at step S220. Accordingly, handover from the asynchronous mobile communication system 20 to the synchronous mobile communication system 30 is completed. Thereafter, the asynchronous modem unit 123 makes transition to an sleep state at step S221.

As described above, in the present invention a call connection between the asynchronous mobile communication system and the asynchronous modem unit is released when call establishment between the synchronous mobile communication system and the synchronous modem unit has been made. The synchronous modem unit of the mobile communication terminal performs an automatic call origination to the synchronous mobile communication system, so that handover can be performed without call interruption.

Figure 6:
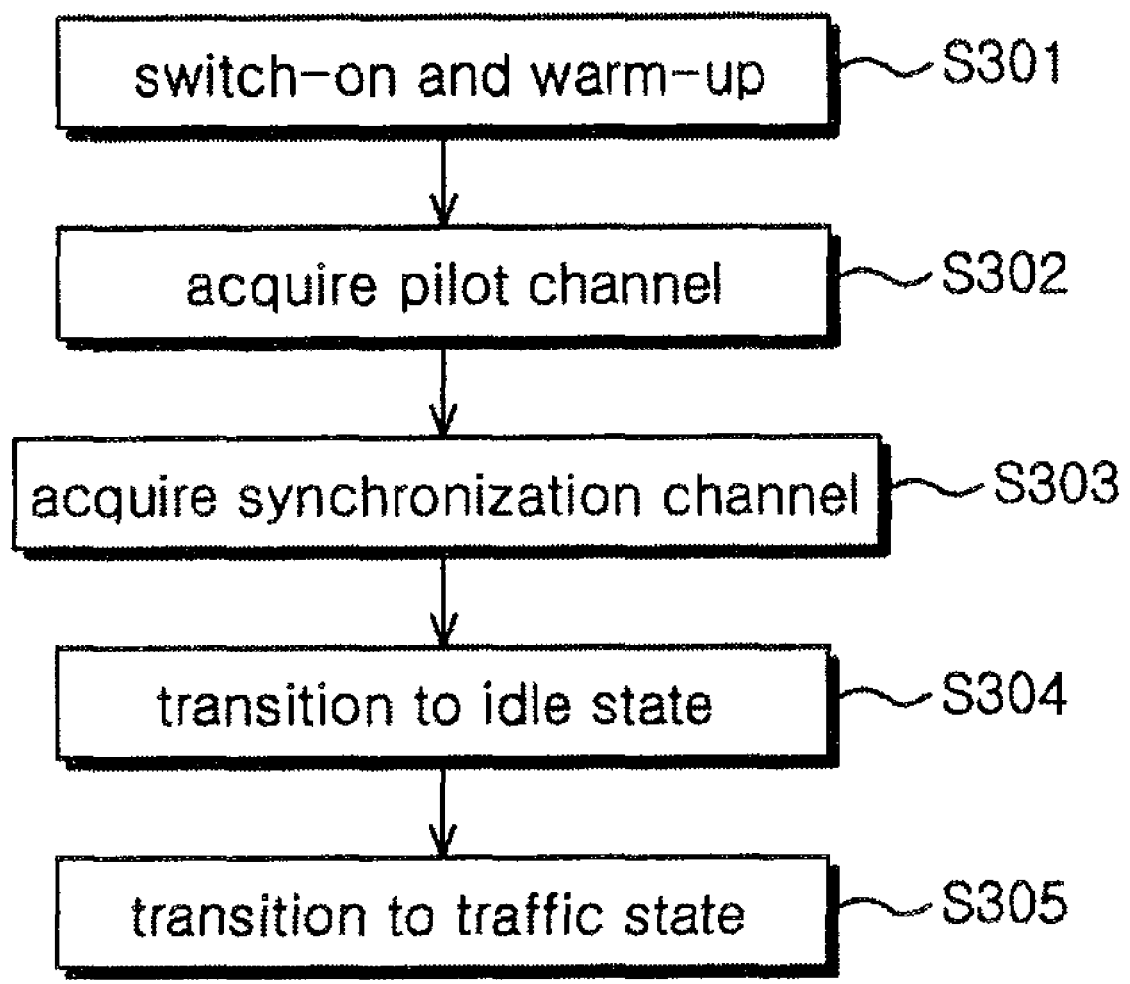
FIG. 6 is a flowchart illustrating a process of preparing communication in a synchronous modem unit shown in FIG. 5 in detail.

FIG. 6 is a flowchart illustrating a process of preparing for communication in the synchronous modem unit shown in FIG. 5 in detail.

The synchronous modem unit 113, which has received information about the channel assignment from the asynchronous modem unit 123, is activated through switch-on and warm-up processes at step S301, and acquires a pilot channel and a synchronization channel at steps S302 and S303. Synchronization between the BTS of the synchronous mobile communication system and the terminal is performed after the acquisition of the pilot channel, and information about timing, the system and the like is received from the BTS after the acquisition of the channels.

Accordingly, the synchronous modem unit 113 of the mobile communication terminal 10 makes transition to a traffic state through the idle state at steps S304 and S305, and connection with the synchronous mobile communication system 30 is made.

In the present invention, connection with the asynchronous mobile communication system is released when connection with a synchronous mobile communication system has been made through an automatic call origination or termination, so that the quality of communication can be improved at the time of handover.

In the present invention described above, those skilled in the art will appreciate that the present invention may be implemented in some other concrete forms without departing from the technical spirit or essential characteristics thereof. Accordingly, it should be understood that the above-described embodiments are illustrative but not restrictive. The scope of the present invention is defined by the appended claims rather than the detailed description, and it should be appreciated that all the modifications derived from the claims and the equivalents thereof are included in the scope of the present invention.

INDUSTRIAL APPLICABILITY

In a mobile communication network in which an asynchronous mobile communication network and a synchronous mobile communication network coexist, at the time of handover of the DBDM mobile communication terminal, the present invention described above completes connection with a target mobile communication system, by the automatic call termination or origination of the mobile communication terminal while maintaining an existing connection with a mobile communication system, and then terminates the existing connection with the mobile communication system, so that it can prevent interruption to a call from occurring at the time of handover, thus improving the quality of service.

The invention claimed is:

1. A handover method of establishing a call from a synchronous modem unit of a Dual Band Dual Mode (DBDM) mobile communication terminal with a synchronous mobile communications system while the mobile communications terminal is in a connected state with an asynchronous mobile communications system via an asynchronous modem unit of the mobile communications terminal, and while the synchronous modem unit is in an idle state, the handover method comprising the steps of:

the asynchronous mobile communication system requesting the synchronous mobile communication system to switch a connection environment of the mobile communication terminal to a synchronous environment, a Mobile Switching Center (MSC) of the synchronous mobile communication system requesting a Base Transceiver System (BTS) of the synchronous mobile communication system to transmit a paging signal;

the BTS transmitting the paging signal to the synchronous modem unit;

the synchronous modem unit receiving the paging signal, transitioning to an active state based on the received paging signal, and transmitting a paging response signal to the BTS; and establishing a call between the synchronous modem unit and the synchronous mobile communication system; and releasing the connection between the asynchronous modem unit and the asynchronous mobile communication system.

2. The handover method according to claim 1, wherein, the asynchronous mobile communication system requesting the synchronous mobile communication system to switch the connection environment of the mobile communication terminal includes the asynchronous mobile communication system transmitting an identification number of the mobile communication terminal.

3. The handover method according to claim 2, further comprising the steps of:

the synchronous mobile communication system requesting routing information from the MSC; and the MSC transmitting routing information to the synchronous mobile communication system.

4. The handover method according to claim 1, wherein establishing the call between the synchronous modem unit and the synchronous mobile communication system comprises the steps of:

the BTS transmitting channel assignment information to the synchronous modem unit;

the BTS transmitting service connection information to the synchronous modem unit;

completing a connection between the synchronous modem unit and the BTS; and the synchronous modem unit notifying the asynchronous modem unit of the completion of the connection with the synchronous mobile communication system.

5. The handover method according to claim 1, wherein releasing the call between the asynchronous modem unit and the asynchronous mobile communication system comprises the steps of:

the synchronous mobile communication system reporting paging results and routing results and issues a call release to the asynchronous mobile communication system;

the asynchronous mobile communication system requesting a call release from the asynchronous modem unit;

the asynchronous modem unit completing the call release in response to the request for the call release; and the asynchronous mobile communication system notifying the synchronous mobile communication system of the completion of the call release.

6. The handover method according to claim 5, further comprising the asynchronous modem unit transitioning to a sleep state after completing the call release.

7. The handover method according to claim 1, further comprising the steps of:

the mobile communication terminal registering a location of the mobile communication terminal to the asynchronous mobile communication system before connecting to the asynchronous mobile communication system; and receiving, at the time of the location registration, notification of a possibility of handover to the synchronous mobile communication system from the asynchronous mobile communication system; and the mobile communication terminal transmitting terminal information to the asynchronous mobile communication system.

8. The handover method according to claim 1, wherein in addition to transmitting the paging response signal to the BTS, the synchronous modem unit transmits system parameters and information about mobile communication terminal access, a BTS frequency, roaming, and neighboring BTSs.

9. A handover method of establishing a call from a synchronous modem unit of a Dual Band Dual Mode (DBDM) mobile communication terminal with a synchronous mobile communications system while the mobile communications terminal is connected with an asynchronous mobile communications system via an asynchronous modem unit of the mobile communications terminal, the handover method comprising the steps of:

while the synchronous modem unit is in an idle state, the asynchronous mobile communication system transmitting a handover request message, including channel assignment information, to the asynchronous modem unit while, the asynchronous modem unit notifying the synchronous modem unit of the handover request and transmitting channel assignment information to the synchronous modem unit;

the synchronous modem unit preparing for communication and then attempting a call origination to the synchronous mobile communication system;

the synchronous modem unit originating a call directly with the synchronous mobile communication system;

the synchronous modem unit notifying the asynchronous modem unit of the completion of a connection with the synchronous mobile communication system; and releasing the connection between the asynchronous mobile communication system and the asynchronous modem unit at a request of the synchronous mobile communication system.

10. The handover method according to claim 9, wherein the handover request message comprises a handover message of the synchronous mobile communication system.

11. The handover method according to claim 9, wherein attempting the call origination includes the synchronous modem using transmitting a predetermined IDentification (ID) number.

12. The handover method according to claim 9, wherein the synchronous modem unit preparing for communication comprises the steps of:

performing switch-on and warm-up of the synchronous modem unit;

acquiring a pilot channel and a synchronous channel from the synchronous mobile communication system; and transitioning from an idle state to a traffic state.

13. The handover method according to claim 12, further comprising performing synchronization between the BTS and the mobile communication terminal after the acquisition of the pilot channel.

14. The handover method according to claim 9, wherein originating the call between the synchronous modem unit and the synchronous mobile communication system comprises the steps of:

a Base Transceiver System (BTS) of the synchronous mobile communication system transmitting a connection request message to a Mobile Switching Center (MSC) of the synchronous mobile communication system, and the MSC requesting channel assignment from the BTS;

the BTS of the synchronous mobile communication system transmitting information about the channel assignment to the synchronous modem unit; and the BTS of the synchronous mobile communication system transmitting service connection information to the synchronous modem unit.

15. The handover method according to claim 9, wherein releasing the call between the asynchronous mobile communication system and the asynchronous modem unit comprises the steps of:

a Base Transceiver System (BTS) of the synchronous mobile communication system notifying a Mobile Switching Center (MSC) of the synchronous mobile communication system of the completion of channel assignment;

the MSC of the synchronous mobile communication system notifying a MSC of asynchronous mobile communication system of the completion of the synchronous connection;

the asynchronous mobile communication system requesting call release from the asynchronous modem unit; and the asynchronous modem unit completing the call release in response to the call release request, and the asynchronous mobile communication system notifying the synchronous mobile communication system of the completion of the call release.

16. The handover method according to claim 15, further comprising the asynchronous modem unit transitioning to a sleep state after completing releasing the call.

* * * * *